VOICE OPERATED CONTROL CIRCUIT

Filed Sept. 24, 1964

INVENTOR
V. E. MUNSON
BY
ATTORNEY

United States Patent Office 3,433,897
Patented Mar. 18, 1969

3,433,897

VOICE OPERATED CONTROL CIRCUIT

Verne E. Munson, Manasquan, N.J., assignor to Bell Telephone Laboratories, Inc., New York, N.Y., a corporation of New York Filed Sept. 24, 1964, Ser. No. 398,877
U.S. Cl. 179—6 3 Claims
Int. Cl. H04m 11/00, 11/08

ABSTRACT OF THE DISCLOSURE

In a telephone answering set false triggering and consequent resetting of the time-out circuit by spurious voice-simulating tones is avoided by making the reset function of the time-out circuit responsive to the trailing edge rather than to the leading edge of the syllabic related envelopes of applied voice signals.

This invention relates to automatic telephone answering and message recording systems and more particularly to systems of this type employing voice-operated control circuits.

A number of telephone answering and message recording systems incorporate a voice-operated circuit to provide control of the recorder during the incoming message recording cycle. A system of this type is shown for example in Patent 2,946,852, issued to W. J. Brown, R. A. Miller and C. M. Taris July 26, 1960. In such systems an incoming call typically activates the telephone answering set and the prerecorded announcement is transmitted to the caller without interruption. At the termination of the announcement, a control unit automatically switches the caller to the incoming message recorder and at the same time applies a single high level "beep" signal on the telephone line which may be followed by a constant amplitude low level tone. The beep signal, which is developed by a warning tone oscillator alerts the user to the fact that his message will be recorded and the low level tone, commonly termed "talk-down" tone, serves as an indication to the user that the volume of his voice must be raised to some preselected level to permit continuous recording. If the user speaks loudly enough, the talk-down tone is automatically terminated. If, however, the user pauses for a period of some preselected duration such as 3 or 4 seconds, for example, or if his voice drops below the preselected volume level, the talk-down tone reappears on the telephone line. The caller is instructed by the announcement or has previous knowledge that in order to leave an acceptable message, he must talk down the tone.

In the absence of speech on the telephone line above the preselected level, the talk-down tone continues for the duration of the time-out interval, on the order of eight seconds for example. Unless the caller speaks before this interval is completed, a time-out circuit, which is a part of the control unit, functions automatically to disconnect the recorder from the telephone line. By speaking a word or two, the caller may interrupt the time-out cycle at any time. Once the time-out cycle is interrupted, it reverts to its starting point.

As indicated, the control unit times-out a call on the basis of whether or not speech at an adequate level is present on the telephone line. Control is achieved by using the syllabic frequency of normal speech rather than the audio frequency. The caller's speech is amplified and rectified. The audio components of the rectified speech are then filtered and applied to a conventional differentiating circuit such that the leading edges of the syllabic modulation components of the speech transmission are utilized to energize suitable relays in the control circuit to control the time-out and tone talk-down facilities.

When talk-down tone is used in combination with a voice-operated circuit in the fashion indicated, the tone must be rejected from the recorder to prevent interference with recording and voice control. The conventional means employed to avoid such interference involves the use of a highly selective notch filter. Reliable operation of the voice-operated circuit is thus contingent on maintaining an exceptionally high degree of accuracy in tracking between the talk-down tone frequency and the frequency of maximum rejection of the notch filter. Owing to the degree of tracking accuracy required, frequency tolerances both in the filter and in the oscillator must be designed and maintained within very close limits. Despite the employment of rigid design specifications and the employment of highly reliable and relatively costly circuit components, such close frequency tolerances are difficult to maintain. The effects of heat and aging can eventually reduce tracking accuracy between the oscillator and filter to an unsatisfactory level. Consequently, the filter passes unwanted frequencies and the voice control circuit is subject to false operation by steady tone signals from the warning tone oscillator.

Accordingly, one object of the invention is to enhance the reliability of voice operated control circuits.

Another object of the invention is to reduce the frequency tolerance requirements in filters employed in voice-operated control circuits.

An additional object is to reduce the frequency tolerance requirements of oscillators employed in talk-down tone voice-operated control circuits.

A further object is to reduce the cost of voice-operated control circuits.

These and other objects are achieved in accordance with the principles of the invention by a voice-control circuit that recognizes speech in terms of syllabic bursts and that generates control signals from the trailing edge of such bursts rather than from the leading edge. The control signals generated in this fashion are employed to operate conventional time-out or delayed circuit disabling means. As a result, spurious control signals which may be generated from unwanted steady tones such as dial tone or tones from the warning oscillator can occur only at a point in time that corresponds to the termination of such tones. At that point in time there is a greater likelihood that time-out action will already have occurred owing to the absence of speech signals for some preselected period and consequently spurious operation of the time-out or delayed circuit disabling means is avoided.

Accordingly, a key feature of the invention is the generation of voice-control signals in a talk-down tone type of automatic recorder in response to the trailing edge only of voice signals that occur above some preselected volume level.

An additional feature of the invention is the utilization of a voice-control circuit in combination with a talk-down tone oscillator and filter having relatively modest frequency and distortion tolerance requirements without sacrificing circuit reliability.

The principles of the invention as well as additional objects and features thereof will be fully apprehended from the following detailed description of an illustrative embodiment and from the appended drawing, in which.

Figure 1:
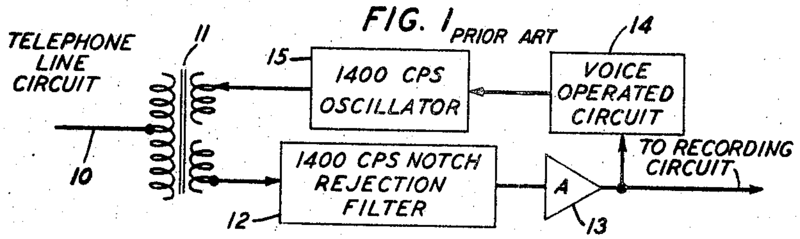
FIG. 1 PRIOR ART
FIG. 1 is a block diagram of a conventional control circuit arrangement for an incoming message recorder.

The general scheme of voice control with talk-down tone is shown by the block diagram of FIG. 1. Speech from the telephone line circuit 10 is applied to an amplifier 13 by way of transformer 11 and filter 12. The output of amplifier 13 is applied directly to a recording circuit (not shown) and also to voice-operated control circuit 14. This circuit includes means for effecting a so-called "time-out" operation. The timer in voice-operated control circuit 14 is reset by applied speech signals having a volume that exceeds some predetermined level. Absence of speech for a predetermined interval permits the timer to time-out, energizing a 1400 cycle per second oscillator 15, commonly termed the talk-down tone oscillator or warning tone oscillator. The tone is transmitted to telephone line 10 as a warning to the calling party that he will soon be disconnected if he does not raise his level of speaking. Notch filter 12 is designed to reject the tone from amplifier 13 and if such rejection does in fact occur, interference with the recording and voice-operated circuit by tone from the oscillator is prevented. Complete circuit details of the arrangement shown in block form in FIG. 1, are disclosed by W. J. Brown et al. in the patent cited above.

Figure 2A:
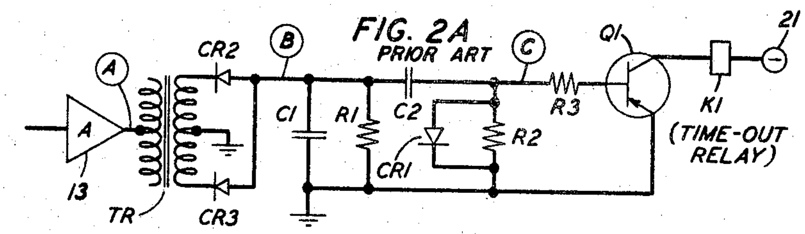
FIG. 2A PRIOR ART
FIG. 2A is a schematic circuit diagram of a part of the voice-operated circuit shown in block form in FIG. 1.
Figure 2B:
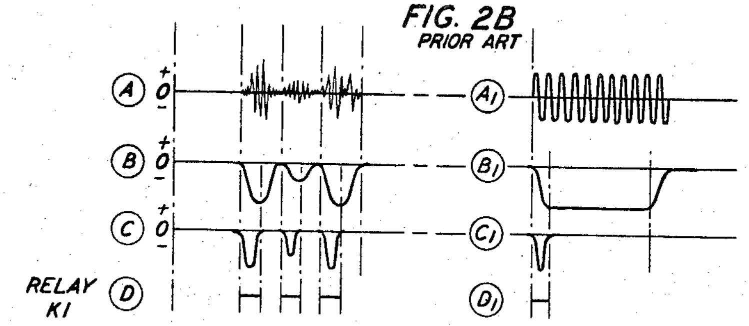
FIG. 2B PRIOR ART
FIG. 2B is an illustrative set of signal waveforms occurring at indicated points in the circuit of FIG. 2A.

FIG. 2A shows a part of a substantially conventional voice-operated circuit which is utilized to detect the syllabic character of speech in the following manner. Speech at the output of amplifier 13, shown as waveform A in FIG. 2B, is rectified by varistors CR2 and CR3 so that a negative polarity voltage, developed across the capacitor-resistor filter comprising capacitor C1 and resistor R1, corresponding to the envelope of the speech, is present at point B. This waveform is indicated on line B of FIG. 2B. The charge on capacitor C2 follows the voltage across capacitor C1 such that when the voltage across capacitor C1 becomes more negative, the charging of capacitor C2 applies a negative or forward bias to transistor Q1 which is normally nonconducting. Collector current from transistor Q1 is applied momentarily to operate relay K1. Relay K1 is diagrammatically illustrative of the time-out circuit.

As the voltage across capacitor C1 is reduced, the discharge current for capacitor C2 is shunted through the low resistance path provided by diode CR1. As indicated in FIG. 2B, line D, relay K1 thus operates momentarily on the leading edge of each burst of speech (or pronounced syllables of the speech) to reset the timer circuit. The generation of the signal occurring at point C in FIG. 2A, which signal is shown on line C of FIG. 2B, may also properly be described in terms of a differentiating operation in which the negative going or leading edge of the signal excursion occurring at point B is differentiated by the combination of resistor R1 and capacitor C2, with the resulting differentiated signal occurring at point C.

In the circuit described above, it is evident that a steady tone such as that illustrated on line $A_1$ of FIG. 2B occurring at point A in FIG. 2A will cause resetting of the timer circuit, illustrated by relay K1, by the initial or leading edge of the tone as shown by waveforms B1 and C1 of FIG. 2B. Such action will necessarily occur if the tracking relation between oscillator 15 and filter 12, shown in FIG. 1, is less than ideal. Moreover, notch filter 12 is designed to reject only a particular frequency such as 1400 cycles for example, and consequently it is essential that the harmonic distortion products of oscillator 15 be maintained at a sufficiently low level to prevent activating the voice circuit. It is thus apparent that malfunction of the voice control circuit can result from either a failure to maintain accurate tracking between the oscillator frequency and the notch filter rejection frequency or from distortion products of the oscillator with the result that the voice-control circuit continuously resets its own timing cycle permanently disabling time-out. Furthermore, the application of a continuous tone such as dial tone which is commonly encountered in automatic telephone answering service when the calling party hangs up during the announcement results in resetting of the timing cycle which increases the total time-out interval.

Figure 3A:
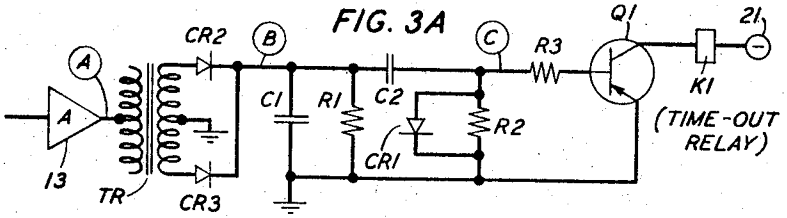
FIG. 3A is a schematic circuit diagram of a portion of a voice-operated control circuit in accordance with the invention.
Figure 3B:
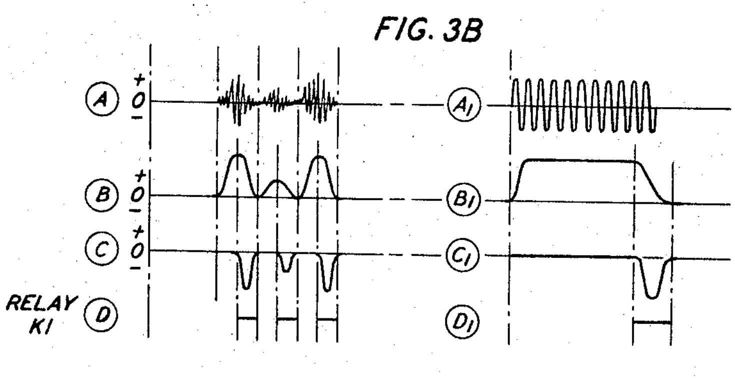
FIG. 3B is an illustrative set of signal waveforms occurring at indicated points in the circuit of FIG. 3A.

In accordance with the invention, by modifying one of the fundamental circuit operating concepts illustrated in FIGS. 2A and 2B, the likelihood of circuit malfunction of the type indicated is markedly reduced. As indicated by the schematic circuit diagram of FIG. 3A, such a change in circuit operating concept is effected, in accordance with the invention, by a seemingly minor yet critical change in the rectifying circuit. Specifically, this critical change resides in reversing the polarity of varistors, or rectifying diodes, CR2 and CR3. As a result of this change, a positive polarity voltage envelope of speech waveform A, rather than a negative polarity voltage envelope, is applied to point B of FIG. 3A. This envelope is shown as waveform B of FIG. 3B. Consequently, the charge current for capacitor C2 occurs on the leading edge of each speech syllable and discharge current on the trailing edge which is to say that once again the speech envelope is differentiated just as in the circuit of FIG. 2A, with the significant exception that in this instance the negative slope of the voltage waveform occurs on the trailing edge of each syllabic burst. The charge current of capacitor C2, corresponding to the leading edge of either speech syllables or steady tones, is thus of the proper polarity to be shunted through diode CR1. The discharge current of capacitor C2 which corresponds to the waveform at point C momentarily forward-biases transistor Q1 at a point in time corresponding to the trailing edge of each syllabic or tone burst causing transistor Q1 to conduct. The operation of transistor Q1 furnishes collector current for the operation of relay K1 which once again is intended as illustrative of the time-out circuit. Relay K1 thus pulses on the trailing edge only of each syllabic or tone burst. Consequently, if for any reason mistracking of oscillator 15 and notch filter 12 should occur or if harmonic distortion products from the oscillator should be passed by filter 12 or if dial tone is present on the line, time-out of the voice-control circuit remains unaffected inasmuch as time-out, in the typical case, has already occurred. As shown in FIG. 3B, lines $A_1$, $B_1$, $C_1$ and $D_1$, the the termination of a steady tone signal may indeed produce a signal that is apparently capable of operating relay K1 to restart the time-out cycle. Normally, however, as indicated, such action does not occur inasmuch as the circuit is designed for time-out to take place prior to the termination of a talk-down tone signal and prior to the termination of dial tone.

The principles of the invention may also be implemented in other ways as, for example, employing an NPN transistor in the circuit of FIG. 2A, rather than a PNP transistor, and by reversing the polarity of diode CR1 in that circuit. Once again, differentiation of the trailing edge of each applied undulatory signal would occur in substantially the same fashion as described above in the discussion of the circuit shown in FIG. 3A.

It is to be understood that the embodiment described herein is merely illustrative of the principles of the invention. Various modifications may be effected by persons skilled in the art without departing from the spirit or scope of the invention.

What is claimed is:

1. A telephone answering set, voice-operated control circuit comprising, in combination;

means for deriving envelope signals from applied oscillatory signals generated within said set or within an associated telephone system, said oscillatory signals including both speech signals and spurious or speech-simulating signals, and each of said envelope signals including a respective leading edge and a respective trailing edge;

means including a time-out circuit, operative upon the absence of incoming speech for a preselected period, for terminating the recording cycle of said set; and means responsive only to said trailing edge of said envelope signals for inhibiting the operation of said terminating means;

thereby avoiding false triggering of said time-out circuit by those of said envelope signals, derived from said spurious or speech-simulating signals, which commence during but terminate after said preselected period.

2. Apparatus in accordance with claim 1 wherein said inhibiting means comprises a differentiating circuit.

3. Apparatus in accordance with claim 1 wherein said deriving means comprises rectifying means and filter means.

References Cited

UNITED STATES PATENTS

| | | | |
|---|---|---|---|
| 2,946,852 | 7/1960 | Brown et al. | 179—6 |
| 2,761,897 | 9/1956 | Jones | 179—1 |

TERRELL W. FEARS, *Primary Examiner.*

RAYMOND F. CARDILLO, Jr., *Assistant Examiner.*

U.S. Cl. X.R.

179—100.1